United States Patent
Humburg et al.

(10) Patent No.: US 11,084,354 B2
(45) Date of Patent: Aug. 10, 2021

(54) VEHICLE HEATER

(71) Applicant: Eberspächer Climate Control Systems GmbH & Co. KG, Esslingen (DE)

(72) Inventors: Michael Humburg, Göppingen (DE); Hans Jensen, Dettingen unter Teck (DE)

(73) Assignee: Eberspächer Climate Control Systems GmbH, Esslingen (DE)

( * ) Notice: Subject to any disclaimer, the term of this patent is extended or adjusted under 35 U.S.C. 154(b) by 530 days.

(21) Appl. No.: 15/954,958

(22) Filed: Apr. 17, 2018

(65) Prior Publication Data

US 2018/0297448 A1 Oct. 18, 2018

(30) Foreign Application Priority Data

Apr. 18, 2017 (DE) .................... 10 2017 108 151.8

(51) Int. Cl.
| | |
|---|---|
| *B60H 1/22* | (2006.01) |
| *F24F 13/24* | (2006.01) |
| *F24H 3/06* | (2006.01) |
| *F24H 9/20* | (2006.01) |
| *F02M 35/12* | (2006.01) |

(52) U.S. Cl.
CPC .......... *B60H 1/2212* (2013.01); *F24F 13/24* (2013.01); *F24H 3/065* (2013.01); *F24H 9/2085* (2013.01); *B60H 2001/2281* (2013.01); *F02M 35/12* (2013.01); *F23D 2210/101* (2013.01); *F23D 2900/21002* (2013.01); *F24F 2013/242* (2013.01)

(58) Field of Classification Search
CPC .. B60H 1/2212; F24F 13/24; F24F 2013/242; F02M 35/12; F24H 3/065
See application file for complete search history.

(56) References Cited

U.S. PATENT DOCUMENTS 3,360,193 A * 12/1967 Harris .................. F04D 29/664
  417/312
4,126,205 A * 11/1978 Bauerschmidt ......... F01N 1/125
  181/256

(Continued)

FOREIGN PATENT DOCUMENTS

| CN | 201025101 Y | 2/2008 |
|---|---|---|
| CN | 103573718 A | 2/2014 |

(Continued)

OTHER PUBLICATIONS

Nichtnennung, DE 2856860 A1 English machine translation, Jul. 17, 1980 (Year: 1980).*

*Primary Examiner* — Kenneth J Hansen
*Assistant Examiner* — Phillip Decker
(74) *Attorney, Agent, or Firm* — McGlew and Tuttle, P.C.

(57) ABSTRACT

A vehicle heater includes a heater housing (12), through which heating air to be heated can flow, with a heating air inlet area and with a heating air outlet area. A burner unit is arranged in the heater housing. A combustion air blower is arranged in the heater housing for feeding combustion air to the burner unit. A heat exchanger unit is arranged in the heater housing (12). Heating air flowing through the heater housing (12) can flow around the heat exchanger unit. A combustion air intake muffler (76), which is essentially arranged in the heater housing (12), is associated with the combustion air blower (46).

14 Claims, 3 Drawing Sheets

(56) References Cited

U.S. PATENT DOCUMENTS

| | | | | |
|---|---|---|---|---|
| 4,281,742 | A * | 8/1981 | Scheuermann | F01N 1/10 181/257 |
| 4,846,300 | A * | 7/1989 | Boda | F02M 35/10321 181/229 |
| 4,923,033 | A * | 5/1990 | Panick | B60H 1/2212 126/116 R |
| 5,603,601 | A * | 2/1997 | Winkelstroter | F04D 23/008 137/271 |
| 6,321,870 | B1 * | 11/2001 | Waronitza | F23M 20/005 181/229 |
| 8,066,096 | B1 * | 11/2011 | Francisco | F02C 7/045 181/214 |
| 8,919,491 | B2 * | 12/2014 | Trumler | G10K 11/172 181/196 |
| 9,617,958 | B2 * | 4/2017 | Hampton | B60T 17/043 |
| 10,697,338 | B2 * | 6/2020 | Neumann | F01N 13/08 |
| 2014/0037469 | A1 * | 2/2014 | Humburg | F04D 29/664 417/352 |
| 2015/0028118 | A1 * | 1/2015 | Panterott | F23M 9/02 237/12.3 C |
| 2018/0326815 | A1 * | 11/2018 | Humburg | F24H 9/0063 |

FOREIGN PATENT DOCUMENTS

| | | | | |
|---|---|---|---|---|
| CN | 205330774 U | 6/2016 | | |
| DE | 28 56 860 A1 | 7/1980 | | |
| DE | 20 2004 015 442 U1 | 2/2006 | | |
| DE | 102008007967 A1 * | 8/2009 | | F23M 20/005 |
| EP | 1935685 A2 * | 6/2008 | | F23M 20/005 |

\* cited by examiner

Fig. 1 (State of the Art)

VEHICLE HEATER

CROSS REFERENCE TO RELATED APPLICATIONS

This application claims the benefit of priority under 35 U.S.C. § 119 of German Application 10 2017 108 151.8, filed Apr. 18, 2017, the entire contents of which are incorporated herein by reference.

FIELD OF THE INVENTION

The present invention pertains to pertains to a vehicle heater, which can be used to heat heating air to be introduced into a vehicle interior.

BACKGROUND OF THE INVENTION

Such a vehicle heater is known from DE 20 2004 015 442 U1. In this vehicle heater, a burner unit, a combustion air blower feeding combustion air to the burner unit and a heat exchanger unit are arranged in a heater housing through which heating air can flow. The heating air flowing through the heater housing flows about these system areas in a heating air flow space on its outer circumferential areas and can thereby absorb heat when flowing around the heat exchanger unit. The combustion air is led to the combustion air blower via a combustion air inlet area. The combustion air inlet area comprises a combustion air inlet connecting piece, which extends outwards away from the combustion air blower essentially radially in relation to a housing longitudinal axis of the heater housing and passes through a housing wall of the heater housing.

SUMMARY OF THE INVENTION

An object of the present invention is to provide a vehicle heater with a compact configuration and a combustion air blower for the vehicle heater with reduced noise emission.

This object is accomplished according to the present invention by a vehicle heater, comprising:
  a heater housing, through which heating air to be heated can flow, with a heating air inlet area and with a heating air outlet area,
  a burner unit arranged in the heater housing,
  a combustion air blower arranged in the heater housing for feeding combustion air to the burner unit,
  a heat exchanger unit, which is arranged in the heater housing and around which heating air flowing through the heater housing can flow,
  wherein a combustion air intake muffler, which is essentially arranged in the heater housing, is associated with the combustion air blower.

Because a combustion air intake muffler is associated with the combustion air blower in the vehicle heater configured according to the present invention, the emission of noises generated especially in the area of the combustion air blower is considerably suppressed over the combustion air inlet area, wherein a compact configuration of the vehicle heater is achieved because of the integration of the combustion air intake muffler into the heater housing, so that additional add-on pieces outside of the heater housing can be dispensed with.

In this case, to utilize the volume available in the heater housing, provisions may be made for the combustion air blower and the heat exchanger unit to be arranged essentially centrally in the heater housing in relation to a housing longitudinal axis and for heating air flowing through the heater housing on its outer circumferential areas to be able to flow around in a heating air flow space enclosing the combustion air blower and the heat exchanger unit, wherein the combustion air intake muffler is essentially arranged in the heating air flow space.

The combustion air blower may comprise a blower motor with a motor shaft, which is rotatable about an axis of rotation, which is essentially parallel or concentric to the housing longitudinal axis, and a combustion air feed wheel, which is coupled to the motor shaft for joint rotation about the axis of rotation, wherein a heating air feed wheel, which is coupled to the motor shaft for joint rotation about the axis of rotation, is provided in the heating air inlet area.

In order to be able to lead the combustion air needed for combustion into the interior of the heater housing, without, however, generating a mixing with the heating air flowing in the heater housing, the invention provides that the combustion air blower has a combustion air inlet area, which passes through a housing wall of the heater housing and guides combustion air to the combustion air intake muffler. In this case, the combustion air inlet area may comprise a combustion air inlet connecting piece with a connecting piece longitudinal axis extending essentially at right angles to the housing longitudinal axis or/and to the axis of rotation.

The above-mentioned object is further accomplished by a combustion air blower, especially for a vehicle heater according to the present invention, comprising:
  a blower body with a feed duct, which extends in a ring-like pattern about an axis of rotation and is open on a first axial side of the blower body in a first axial direction,
  a combustion air feed wheel located opposite the blower body on its first axial side with a ring-like feed area overlapping the feed duct with a plurality of feed blades following one another in the circumferential direction about the axis of rotation,
  a blower motor arranged on a second axial side of the blower body, which second axial side is opposite the first axial side of the blower body, with a motor shaft rotatable about the axis of rotation, wherein the motor shaft is coupled to the combustion air feed wheel for joint rotation about the axis of rotation,
  a feed duct inlet area, which is open towards the feed duct, in the blower body for the inlet of combustion air into the feed duct, and
  a combustion air intake muffler arranged essentially on the second axial side of the blower body.

A configuration which is radially compact and can thus easily be integrated into a heater housing is obtained with the combustion air intake muffler provided on the second axial side.

In order to achieve a sufficiently long flow path of the combustion air, which is advantageous for a good muffling characteristic, it is proposed that the combustion air intake muffler comprise a first muffler flow path leading combustion air from a combustion air inlet area of the combustion air blower essentially in a second axial direction, which is opposite the first axial direction, away from the second axial side of the blower body and a second muffler flow path leading combustion air essentially in the first axial direction to the feed duct inlet area.

For guiding the combustion air in the combustion air intake muffler to be led to the combustion air blower, provisions may be made for the combustion air inlet area to comprise a combustion air inlet connecting piece, which is preferably made integral with the blower body, with a connecting piece longitudinal axis essentially extending at right angles to the axis of rotation, wherein a first combustion air flow opening, which is adjacent to the combustion air inlet connecting piece, preferably with a first opening axis essentially oriented parallel to the axis of rotation, and a second combustion air flow opening, which is open towards the feed duct inlet area, preferably with a second opening axis, which is essentially oriented parallel to the axis of rotation, are provided in the blower body.

A simple and compact configuration can in this case be guaranteed by the first combustion air flow opening and the second combustion air flow opening being formed in a flow opening attachment, which essentially extends in the second axial direction on the second axial side of the blower body and is preferably made integral with the blower body.

In order to efficiently utilize the radial installation space generally available in a vehicle heater, it is proposed that the first combustion air flow opening be arranged radially outside of the second combustion air flow opening.

The combustion air intake muffler may comprise a muffler housing, which is arranged on the second axial side of the blower body and is connected to the blower body, wherein muffling material can be arranged in the muffler housing to obtain the desired muffling characteristic.

It should be noted that in the sense of the present invention such muffling material is a, for example, porous, foam-like or fibrous material, which has a higher rate of muffling than, for example, the material, e.g., plastic material, of which the muffler housing itself is made.

The first muffler flow path and the second muffler flow path are preferably essentially formed in the muffler housing. This can be achieved in a simple manner by a muffling body made of muffling material being arranged in the muffler housing, wherein the first muffler flow path and the second muffler flow path are formed in the muffling body.

Because the radial installation space available in a heating air blower is generally limited, for a sufficiently long flow path of the combustion air in the combustion air intake muffler, the first muffler flow path and the second muffler flow path essentially extend parallel to the axis of rotation, wherein the first muffler flow path is preferably arranged radially outside of the second muffler flow path.

In order to be able to provide the combustion air intake muffler as an independent assembly unit, which is adapted to a variety of designs of vehicle heaters, a motor housing, which is preferably made integral with the blower body, may be provided on the second axial side of the blower body, and that the combustion air intake muffler be arranged outside of the motor housing.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
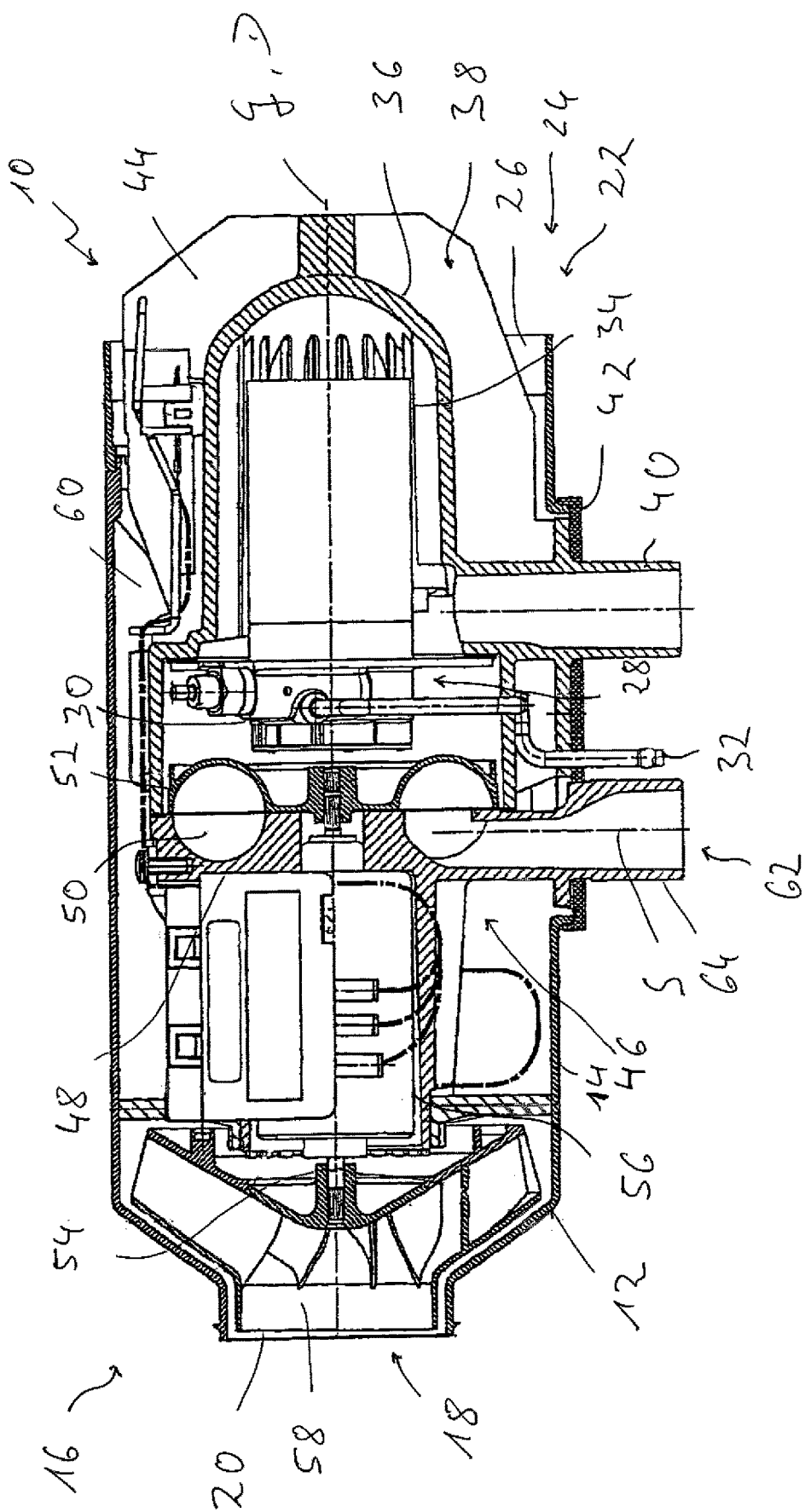
FIG. 1 is a longitudinal sectional view of a vehicle heater.

Referring to the drawings, FIG. 1 shows a vehicle heater 10 known from DE 20 2004 015 442 U1 in a longitudinal view, cut along a housing longitudinal axis G. Before the basic configuration of this vehicle heater 10 is explained below, it should be noted that this configuration may also be implemented in a vehicle heater configured according to the present invention. In this respect, the following explanations about the configuration of the vehicle heater 10 apply, in principle, also to some features of the configuration of a vehicle heater 10', configured according to the present invention.

The vehicle heater 10 comprises a heater housing, which is generally designated by 12, with a housing wall 14 extending in the direction of the housing longitudinal axis G. A heating air inlet area 18 with a heating air inlet opening 20, which is preferably concentric to the housing longitudinal axis G, is provided at an axial end area 16 of the heater housing 12. A heating air outlet area 24 with a heating air outlet opening 26, which is preferably concentric to the housing longitudinal axis G, is provided at the other axial end area 22 of the heater housing 12.

A burner unit, which is generally designated by 28, is arranged in the interior of the heater housing 12. This burner unit comprises a combustion chamber housing 30, in which, for example, a porous evaporator medium absorbing liquid fuel fed via a fuel feed line 32 may be provided. The liquid fuel that is absorbed in the porous evaporator medium is discharged in the direction of a combustion chamber and burned there together with combustion air, so that combustion waste gases generated thereby flow along a flame tube 34. The burner unit 28 is carried together with the flame tube 34 at a housing 36 of a heat exchanger unit, which is generally designated by 38. On an inner side of the housing 36, the combustion waste gases leaving the flame tube 34 flow in the direction of a waste gas discharge pipe 40, which passes through the housing wall 14 of the heater housing 12 or a cover-like closing element 42 essentially radially in relation to the housing longitudinal axis G. On a housing outer side, the housing 36 has a plurality of heat transfer ribs 44, around which heating air flowing in the direction of the heating air outlet area 24 can flow and which can thereby transfer heat to the heating air.

A combustion air blower, which is generally designated by 46, is further provided in the heater housing 12. This combustion air blower 46, which is configured as a side channel blower, comprises a disk-like blower body 48, which has on an axial side an axially open feed duct 50, which encloses the housing longitudinal axis G in the ring-like pattern. A combustion air feed wheel 52 is coupled on a motor shaft 54 of a blower motor 56 to this blower motor 56 for joint rotation about an axis of rotation D. The axis of rotation D, for example, essentially corresponding to the housing longitudinal axis G or parallel to the housing longitudinal axis G. The combustion air feed wheel 52 is located opposite the feed duct 50. Further, a heating air feed wheel 58, which is arranged in the area of the heating air inlet area 18, is coupled to the motor shaft of the blower motor 56 for joint rotation about the axis of rotation D. The blower motor 56 thus drives both the combustion air feed wheel 52 and the heating air feed wheel 58 in order to lead combustion air in the direction of the burner unit 28, on the one hand, and to feed heating air into a heating air flow space 60 formed in the heater housing 12, on the other hand. The heating air flowing through the heating air flow space 60 flows around the combustion air blower 46 and the heat exchanger unit 38 on their outer sides and hereby absorbs heat especially when it flows around the housing 36 of the heat exchanger unit 38 and leaves the heater housing 12 at the heating air outlet area 24 in a heated state.

A combustion air inlet area 62, which comprises a combustion air inlet connecting piece 64 with a connecting piece longitudinal axis S extending essentially radially in relation to the axis of rotation D and the housing longitudinal axis G, is provided at the blower body 48 of the combustion air blower 46 for feeding combustion air to the feed duct 50. The combustion air inlet connecting piece 64 passes through the housing wall 14 and the closing element 42 and extends essentially radially through the heating air flow space 60. A line, for example, a flexible tube, may be connected to the combustion air inlet connecting piece 64 outside of the heater housing 12.

A combustion air blower, which is configured according to the principles of the present invention and which can be used in the vehicle heater described above with reference to FIG. 1, will be described below with reference to FIGS. 2-5. Components and assembly units, which correspond to components and assembly units in terms of configuration and function described above with reference to FIG. 1, are designated here by similar reference numbers, as they were used above with reference to FIG. 1, except they have a prime (') designation to indicate the component is part of a combustion air blower 46' according to the invention.

Figure 2:
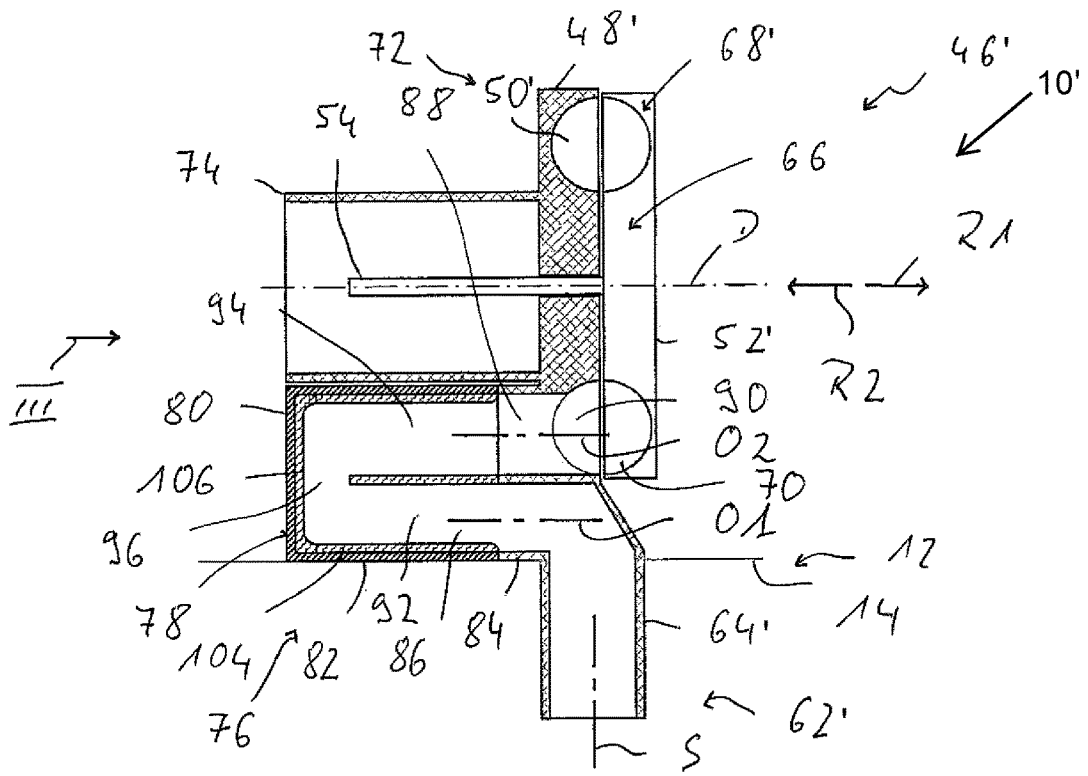
FIG. 2 is a longitudinal sectional view of a vehicle heater according to the invention showing a combustion air blower which can be used in the vehicle heater of FIG. 1.

The combustion air blower 46' shown in FIG. 2 comprises the disk-like blower body 48', which is, for example, made of metallic material, which on its first axial side 66 has the feed duct 50' which is open in a first axial direction R1 and encloses the axis of rotation D in a ring-like pattern. A ring-like feed area 68' of the combustion air feed wheel 52' with a plurality of feed blades 70 provided on it is located axially opposite the feed duct 50'. The motor shaft 54 passes through the blower body 48' and is coupled to the combustion air feed wheel 52' for joint rotation about the axis of rotation D on the first axial side over this projecting area.

A motor housing 74, which is preferably made integral with the blower body 48' and extends in a second axial direction R2, which is essentially oriented opposite the first axial direction R1, is provided on a second axial side 72 oriented opposite the first axial side 66. The blower motor 56 shown in FIG. 1 can be accommodated in the motor housing 74.

A combustion air intake muffler, which is generally designated by 76, is provided outside of the motor housing 74. The combustion air intake muffler 76 comprises a muffler housing 78 having an essentially pot-like configuration with a bottom wall 80 and a circumferential wall 82. The muffler housing 78 is fixed with its circumferential wall 82 to a flow opening attachment 84, which is preferably made integral with the blower body 48'. A first combustion air flow opening 86 and a second combustion air flow opening 88 with opening axes O1, O2, which are essentially parallel to one another and to the axis of rotation D, are formed in the flow opening attachment 84. The combustion air inlet connecting piece 64', which is preferably made integral with the blower body 48', is adjacent to the first combustion air flow opening 86. This connecting piece 64' has a connecting piece longitudinal axis S, which is oriented essentially at right angles to the opening axes O1, O2 and also to the axis of rotation D. At a combustion inlet area 62', the combustion air essentially flowing from radially outwards to radially inwards via the combustion air inlet connecting piece 64 is essentially deflected by 90° in the transition area to the first combustion air flow opening 86 and flows in the or out of the first combustion air flow opening 86 essentially in the second axial direction R2. In the second combustion air flow opening 88, the combustion air flows in the opposite direction, i.e., essentially in the first axial direction R1 towards a feed duct inlet area 90, via which the combustion air enters the ring-like feed duct 50'. In this case, the two combustion air flow openings 86, 88 are preferably essentially arranged radially staggered, so that the first combustion air flow opening 86 is positioned radially outside of the second combustion air flow opening 88 and also radially outside of the feed duct 50'.

Muffler flow paths 92, 94 associated with the two combustion air flow openings 86, 88 are formed in the muffler housing 78 arranged axially adjacent to the flow opening attachment 84. In this case, a first muffler flow path 92 adjacent to the first combustion air flow opening 86 essentially extends in the direction of the opening axis O1, so that the combustion air entering the first muffler flow path 92 via the first combustion air flow opening 86 essentially flows in the first muffler flow path 92 in the second axial direction R2. In a deflection area 96, in which the second muffler flow path 94 is adjacent to the first muffler flow path 92, the combustion air is deflected by about 180°, so that the combustion air essentially flows in the second muffler flow path 94 in the first axial direction R1 towards the second combustion air flow opening 88.

Figure 4:
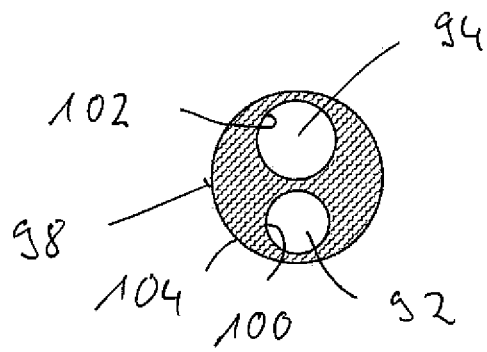
FIG. 4 is a cross-sectional view of a muffling body used in the combustion air blower of FIG. 2.

A muffling body 98, which is made of a muffling material, is arranged in the muffler housing 78. The circumferential contour of the muffling body is adapted to the inner contour of the muffler housing 78, so that this muffler housing is in contact with an inner circumferential surface of the circumferential wall 82 and with an inner bottom surface of the bottom wall 80 and is held thereon. Openings 100, 102 formed in the muffling body shown in cross section in FIG. 4 are provided, for example, with a circular cross section, forming the two muffler flow paths 92, 94. For providing the deflection area 96, the muffling body 98 may have a multipart configuration with a body part 104, which has an essentially cylindrical shape and provides the openings 100, 102, and with a body part 106 closing this muffling body axially and essentially providing the deflection area 96. The muffling body 98 is advantageously entirely accommodated in the muffler housing 78, so that no design changes have to be provided at the blower body 48' and at the flow opening attachment 84 for receiving muffling material.

Figure 3:
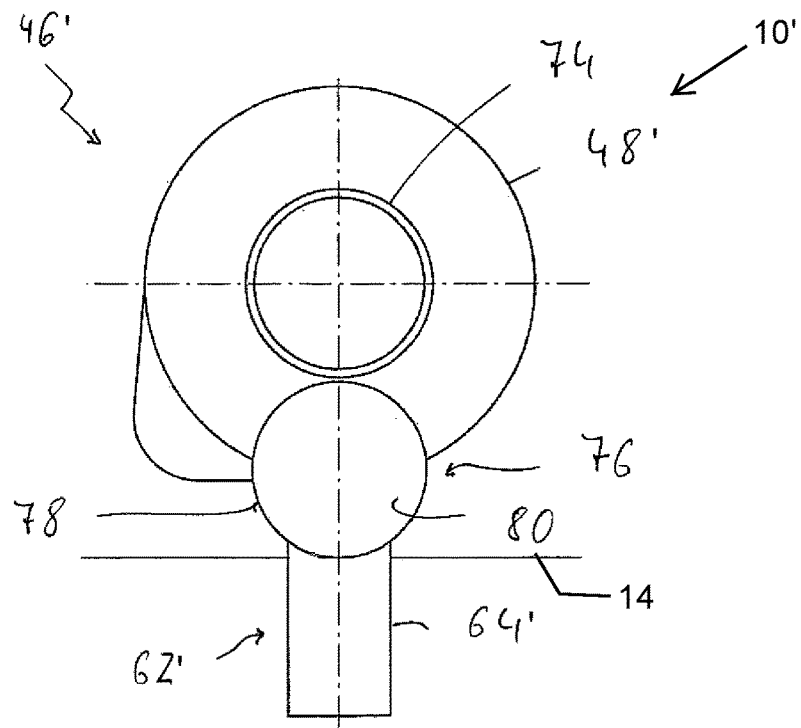
FIG. 3 is an axial view of the vehicle heater of FIG. 2 showing the combustion air blower of FIG. 2 in viewing direction III in FIG. 2.

The housing wall 14 of the heater housing 12 and the closing element 42 provided on the housing wall 14 and forming a part of same is also shown as a suggestion in FIGS. 2 and 3. It is seen that the combustion air blower 46' is arranged together with the combustion air intake muffler 76 in the interior of the heater housing 12, especially in the heating air flow space 60 through which heating air can flow. The combustion air inlet connecting piece 64' is essentially oriented and also positioned in relation to the blower body 48' as this is the case in the embodiment of the combustion air blower known from the state of the art and shown in FIG. 1. The combustion air blower 46' shown in FIG. 2 can thus be integrated into this heater housing 12 to provide a vehicle heater 10' according to the invention, without extensive structural changes to the vehicle heater 10 or to the heater housing 12. In this case, the combustion air intake muffler 76 is also integrated into the heater housing 12, so that no further structural changes are necessary outside of the heater housing 12 in order to be able to provide a muffling functionality.

Figure 5:
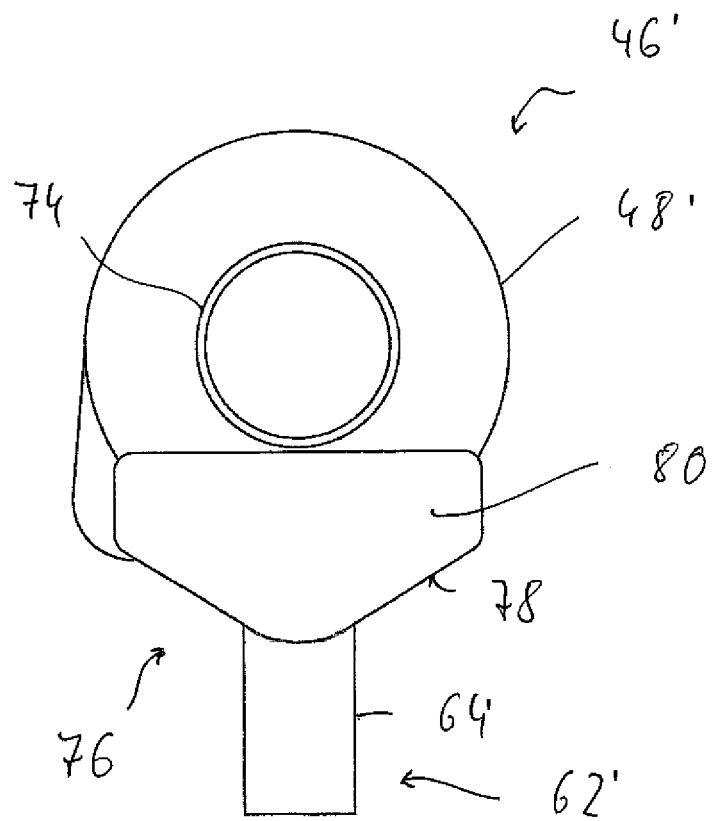
FIG. 5 is an axial view of a combustion air blower corresponding to FIG. 3 with an alternative embodiment of a combustion air intake muffler.

FIG. 5 shows a modified embodiment of the combustion air intake muffler 76. In particular, it can be seen that the muffler housing 78 thereof is not configured with a circular circumferential contour, as in the embodiment according to FIG. 3, but has a more extensive structure especially in the circumferential direction about the axis of rotation D and the housing longitudinal axis G. A larger volume is thus provided for the flow of combustion air in the muffler housing 78. More than two muffler flow paths, which can be seen in FIG. 2, can be provided in this arrangement, in order to provide a meandering flow path structure with further improved muffling characteristic.

While specific embodiments of the invention have been shown and described in detail to illustrate the application of the principles of the invention, it will be understood that the invention may be embodied otherwise without departing from such principles.

What is claimed is:

1. A vehicle heater comprising:
   a heater housing, through which heating air to be heated flows, with a heating air inlet area and with a heating air outlet area;
   a burner unit arranged in the heater housing;
   a combustion air blower arranged in the heater housing for feeding combustion air to the burner unit;
   a heat exchanger unit arranged in the heater housing and around which heating air flowing through the heater housing flows; and
   a combustion air intake muffler arranged in the heater housing and associated with the combustion air blower, wherein the combustion air intake muffler comprises a first muffler flow path leading combustion air from a combustion air inlet area of the combustion air blower in one axial direction, which is opposite another axial direction, away from an axial side of the blower body and a second muffler flow path leading combustion air in the another axial direction to the feed duct inlet area, the combustion air intake muffler comprising a muffler housing, which is arranged on the axial side of the blower body and is connected to the blower body, the first muffler flow path and the second muffler flow path being formed in the muffler housing, wherein a muffling body made of a muffling material is arranged in the muffler housing, the first muffler flow path and the second muffler flow path being formed in the muffling body, the first muffler flow path and the second muffler flow path extending parallel to the axis of rotation, the first muffler flow path being arranged radially outside of the second muffler flow path.

2. The vehicle heater in accordance with claim 1, wherein:
   the combustion air blower and the heat exchanger unit are arranged centrally in the heater housing in relation to a housing longitudinal axis;
   heating air flowing through the heater housing on outer circumferential areas flows around in a heating air flow space enclosing the combustion air blower and the heat exchanger unit; and
   the combustion air intake muffler is arranged in the heating air flow space.

3. The vehicle heater in accordance with claim 1, wherein the combustion air blower comprises:
   a blower motor with a motor shaft, which motor shaft is rotatable about an axis of rotation, which is parallel or concentric to a housing longitudinal axis; and
   a combustion air feed wheel coupled to the motor shaft for joint rotation about the axis of rotation, wherein a heating air feed wheel is coupled to the motor shaft for joint rotation about the axis of rotation and is provided in the heating air inlet area.

4. The vehicle heater in accordance with claim 1, wherein the combustion air blower has a combustion air inlet area, which passes through a housing wall of the heater housing and guides combustion air to the combustion air intake muffler.

5. The vehicle heater in accordance with claim 4, wherein the combustion air inlet area comprises a combustion air inlet connecting piece with a connecting piece longitudinal axis extending at right angles to the housing longitudinal axis or extending at right angles to the axis of rotation or extending at right angles to the housing longitudinal axis and extending at right angles to the axis of rotation.

6. The vehicle heater in accordance with claim 1, wherein the combustion air inlet area comprises a combustion air inlet connecting piece, which is made integral with the blower body, with a connecting piece longitudinal axis extending at right angles to the axis of rotation, wherein a first combustion air flow opening, which is adjacent to the combustion air inlet connecting piece, with a first opening axis oriented parallel to the axis of rotation, and a second combustion air flow opening, which is open towards the feed duct inlet area, with a second opening axis, which is oriented parallel to the axis of rotation, are provided in the blower body.

7. A combustion air blower, for a vehicle heater, the combustion air blower comprising:
   a blower body with a feed duct, which feed duct extends with a ring pattern about an axis of rotation and is open on a first axial side of the blower body in a first axial direction;
   a combustion air feed wheel located opposite the blower body on a first axial side, with a ring pattern feed area overlapping the feed duct and with a plurality of feed blades following one another in a circumferential direction about the axis of rotation;
   a blower motor arranged on a second axial side of the blower body, which second axial side is opposite the first axial side of the blower body, and with a motor shaft rotatable about the axis of rotation, the motor shaft being coupled to the combustion air feed wheel for joint rotation about the axis of rotation;
   a feed duct inlet area open towards the feed duct and in the blower body for the inlet of combustion air into the feed duct; and
   a combustion air intake muffler arranged on the second axial side of the blower body, the combustion air intake muffler comprising a muffler housing, which is arranged on the second axial side of the blower body and is connected to the blower body, wherein a first muffler flow path and a second muffler flow path are formed in the muffler housing, wherein a muffling body made of a muffling material is arranged in the muffler housing, the first muffler flow path and the second muffler flow path being formed in the muffling body.

8. The combustion air blower in accordance with claim 7, wherein the first muffler flow path leads combustion air from a combustion air inlet area of the combustion air blower in a second axial direction, which is opposite the first axial direction, away from the second axial side of the blower body and the second muffler flow path leads combustion air in the first axial direction to the feed duct inlet area.

9. The combustion air blower in accordance with claim 8, wherein the combustion air inlet area comprises a combustion air inlet connecting piece, which is made integral with the blower body, with a connecting piece longitudinal axis extending at right angles to the axis of rotation, wherein a first combustion air flow opening, which is adjacent to the combustion air inlet connecting piece, with a first opening axis oriented parallel to the axis of rotation, and a second combustion air flow opening, which is open towards the feed duct inlet area, with a second opening axis, which is oriented parallel to the axis of rotation, are provided in the blower body.

10. The combustion air blower in accordance with claim 9, wherein the first combustion air flow opening and the second combustion air flow opening are formed in a flow opening attachment, which extends in the second axial direction on the second axial side of the blower body and is made integral with the blower body.

11. The combustion air blower in accordance with claim 9, wherein the first combustion air flow opening is arranged radially outside of the second combustion air flow opening.

12. The combustion air blower in accordance with claim 7, wherein the combustion air intake muffler comprises a muffler housing, which is arranged on the second axial side of the blower body and is connected to the blower body.

13. The combustion air blower in accordance with claim 7, wherein:
the first muffler flow path and the second muffler flow path extend parallel to the axis of rotation; and
the first muffler flow path is arranged radially outside of the second muffler flow path.

14. The combustion air blower in accordance with claim 7, further comprising a motor housing made integral with the blower body, wherein:
the motor housing is provided on the second axial side of the blower body; and
the combustion air intake muffler is arranged outside of the motor housing.

* * * * *